US005546426A

United States Patent [19]

Tomiyori

[11] Patent Number: 5,546,426

[45] Date of Patent: Aug. 13, 1996

[54] METHOD FOR EXECUTING A CODING AND DECODING PROCESS COMPRISING SUBPROCESSES

[75] Inventor: Makio Tomiyori, Tokyo, Japan

[73] Assignee: NEC Corporation, Tokyo, Japan

[21] Appl. No.: 267,554

[22] Filed: Jun. 21, 1994

[30] Foreign Application Priority Data

Jun. 21, 1993 [JP] Japan .................................... 5-149498

[51] Int. Cl.[6] .................................................... H04B 14/04

[52] U.S. Cl. ............................. 375/242; 341/67; 375/246

[58] Field of Search .................................... 375/240, 241, 375/242, 246; 341/67, 75, 78; 382/56; 348/384, 390, 410, 421

[56] References Cited

U.S. PATENT DOCUMENTS

| | | | |
|---|---|---|---|
| 5,086,439 | 2/1992 | Asai et al. | 375/241 |
| 5,235,623 | 8/1993 | Sugiyama et al. | 375/241 |

FOREIGN PATENT DOCUMENTS

| | | |
|---|---|---|
| 6-77910 | 3/1994 | Japan . |

OTHER PUBLICATIONS

Schroeder et al.,, "Code–Excited Linear Prediction (CELP): High–Quality Speech At Very Low Bit Rates", IEEE, pp. 937–940, (1985).

*Primary Examiner*—Stephen Chin
*Assistant Examiner*—Don Vo
*Attorney, Agent, or Firm*—Foley & Lardner

[57] ABSTRACT

The method for executing coding subprocesses and decoding subprocesses calculates a first time interval from a current point to a variable output point of the coded output signals. Similarly, a second time interval from the current point to an output point of the decoded output signals is calculated. Second, a total processing time of a subsequent coding and decoding subprocesses is calculated. The subsequent subprocesses are both allowed to be subsequently executed. Finally, one subprocess to be subsequently executed is selected from the subsequent coding and decoding subprocesses by comparing the total processing time with a smaller one of the first and the second time intervals.

10 Claims, 7 Drawing Sheets

POINTER MEMORY 105

| | |
|---|---|
| CODING I/O POINTER | Pco |
| DECODING I/O POINTER | Pdec |
| CODED DATA OUTPUT POINTER | Pco−out |
| DECODED DATA OUTPUT POINTER | Pdec−out |

PROCESSING TIME MEMORY 106

| CODING SUBPROCESS | DECODING SUBPROCESS |
|---|---|
| Tco−0 | Tdec−0 |
| Tco−1 | Tdec−1 |
| Tco−2 | Tdec−2 |
| Tco−3 | Tdec−3 |

METHOD FOR EXECUTING A CODING AND DECODING PROCESS COMPRISING SUBPROCESSES

FIELD OF THE INVENTION

The present invention relates to techniques for coding and decoding (CODEC) of information and, more specifically, to an improvement of speech information processing system in which a coding and decoding process is divided into a plurality of a subprocesses.

BACKGROUND OF THE INVENTION

A speech CODEC scheme which is realized by a one-chip digital signal processor (DSP) has been proposed by Nakamura and Hioki, achieving a compact, lightweight CODEC device suitable for use in equipment such as digital portable telephones. (See Japanese Patent Application Laid-open No. Hei 6-77910).

In the proposed speech CODEC scheme, a coding and decoding process for each frame is comprised of a frame process and a plurality of subprocesses. Under such conditions that coded data is received and transmitted in units of a frame at a predetermined timing, the sequence of the coding and decoding subprocesses is determined in advance to minimize coding delay time and decoding delay time, where the coding delay time is the time difference between an input time of speech data to be coded and an output time of coded data, and the decoding delay time is the time difference between an input time of coded data to be decoded and an output time of decoded data.

In the one-chip DSP CODEC device, this CODEC scheme can reduce the time interval from transmission to reception of coded data to an allowable time interval. More specifically, the time interval from a transmission time point of coded data as obtained by the coding process to a reception time point of coded data to be decoded by the decoding process can be reduced to the allowable time interval prescribed in mobile communications standards (e.g. 5.75 msec in GSM).

However, when a data signal of changing the transmission timing is received for each frame, the transmission timing of coded data is varied, usually delayed. When receiving the transmission timing charge data, a conventional speech CODEC system operates as shown in FIG. 1.

FIG. 1 shows the main process of a conventional speech CODEC system, in which the coding and decoding process is comprised of four coding subprocesses, four decoding subprocesses, and a waiting subprocess where neither coding nor decoding is made during the remaining time in a frame.

Referring to FIG. 1, it is checked whether the timing data indicating the transmission timing of coded data has been received (step 11). If affirmative, it is then checked whether the transmission timing has been adjusted for the frame (step 12). If negative, it is then checked whether the timing data includes the data of changing the transmission timing (step 13). If the timing change data exists, transmission timing is adjusted (step 14). The subprocess to be executed next is then selected based on the predetermined sequence (step 15), and the selected subprocess is executed (step 16).

However, in the above conventional execution method, even when the transmission timing is delayed, the coding subprocesses 0–3 are executed in fixed timing regardless of the transmission timing delay. This causes the coding process to finish considerably before the actual transmission timing, which means that the coding delay time may extend up to one frame.

SUMMARY OF THE INVENTION

An object of the present invention is to provide a method for executing coding and decoding of speech which reduces delay in coding and decoding when the transmission timing of coded data is changed.

In a method for executing a coding and decoding process according to the present invention, after adjusting the output timing of coded data as obtained by coding, the remaining time in a frame is calculated. The remaining time is comprised of a first time interval remaining until an output time of the coded data in the frame and a second time interval remaining until an output time of the decoded data in the frame. Based on the calculated remaining times, either coding or decoding subprocess is selected for the next processing. Such a operation is repeated until coding and decoding of each frame is completed.

The method according to the present invention first calculates a first time interval from a current point to a variable output point of the coded output signals, the variable output point depending on the variable transmission timing of the coded data. Similarly, a second time interval from the current point to an output point of the decoded output signals is calculated, the output point depending on the constant receiving timing of coded data. Second, a total processing time of a subsequent coding and decoding subprocesses is calculated. The subsequent subprocesses are both allowed to be subsequently executed according to the respective predetermined sequences of the coding subprocesses and the decoding subprocesses. Finally, one subprocess to be subsequently executed is selected from the subsequent coding and decoding subprocesses by comparing the total processing time with a smaller one of the first and the second time intervals.

Selection of the one subprocess to be subsequently executed is made preferably as follows: the subsequent coding subprocess is selected if the total processing time is not larger than a smaller time interval, and the subsequent decoding subprocess is selected if the total processing time is larger than the smaller one. Preferably the smaller time interval is the second time interval.

DETAILED DESCRIPTION OF THE PREFERRED EMBODIMENTS

Figure 1:
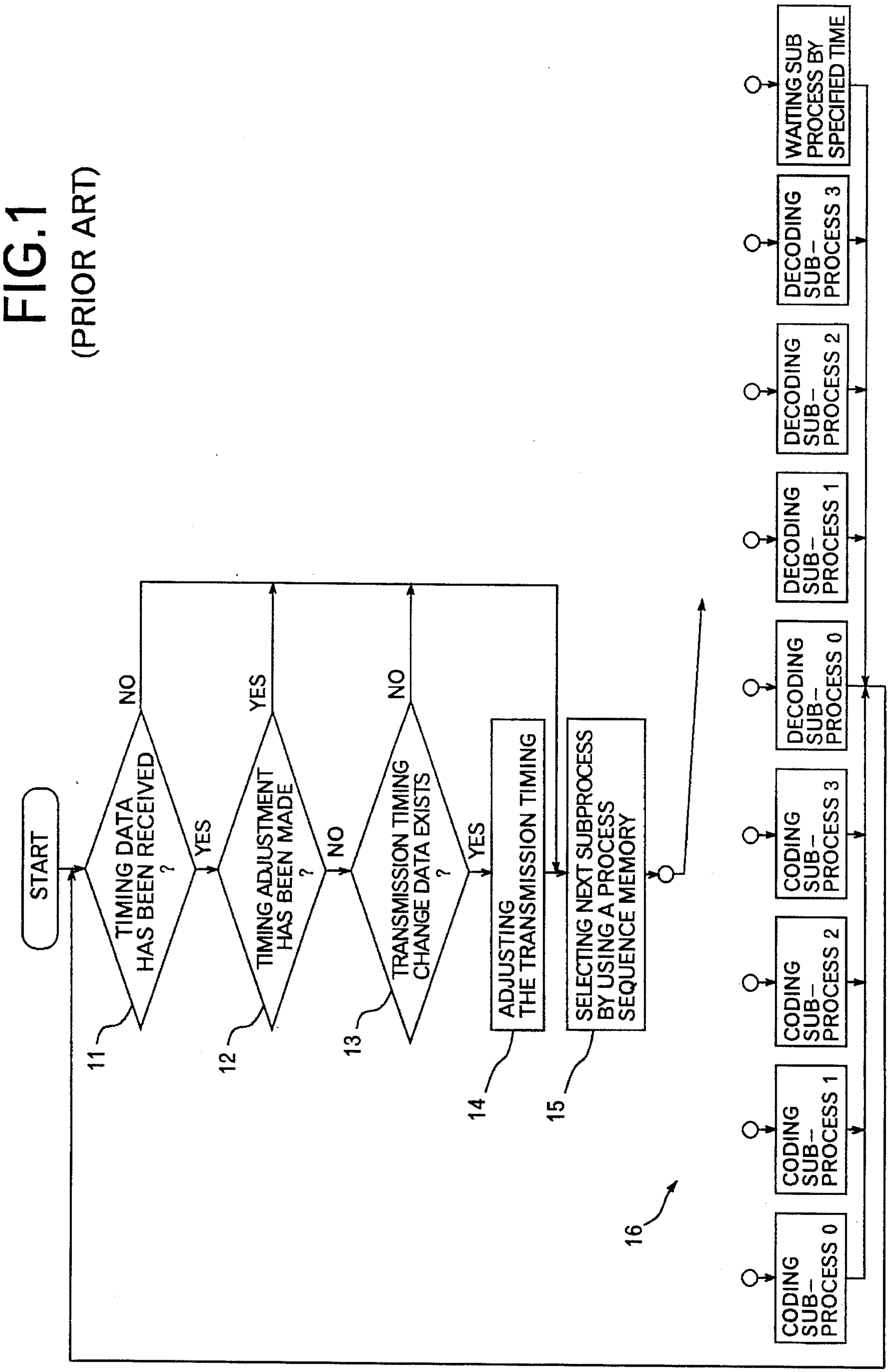
FIG.1 (PRIOR ART)
FIG. 1 is a main process flowchart of a conventional audio processing system.
Figure 2:
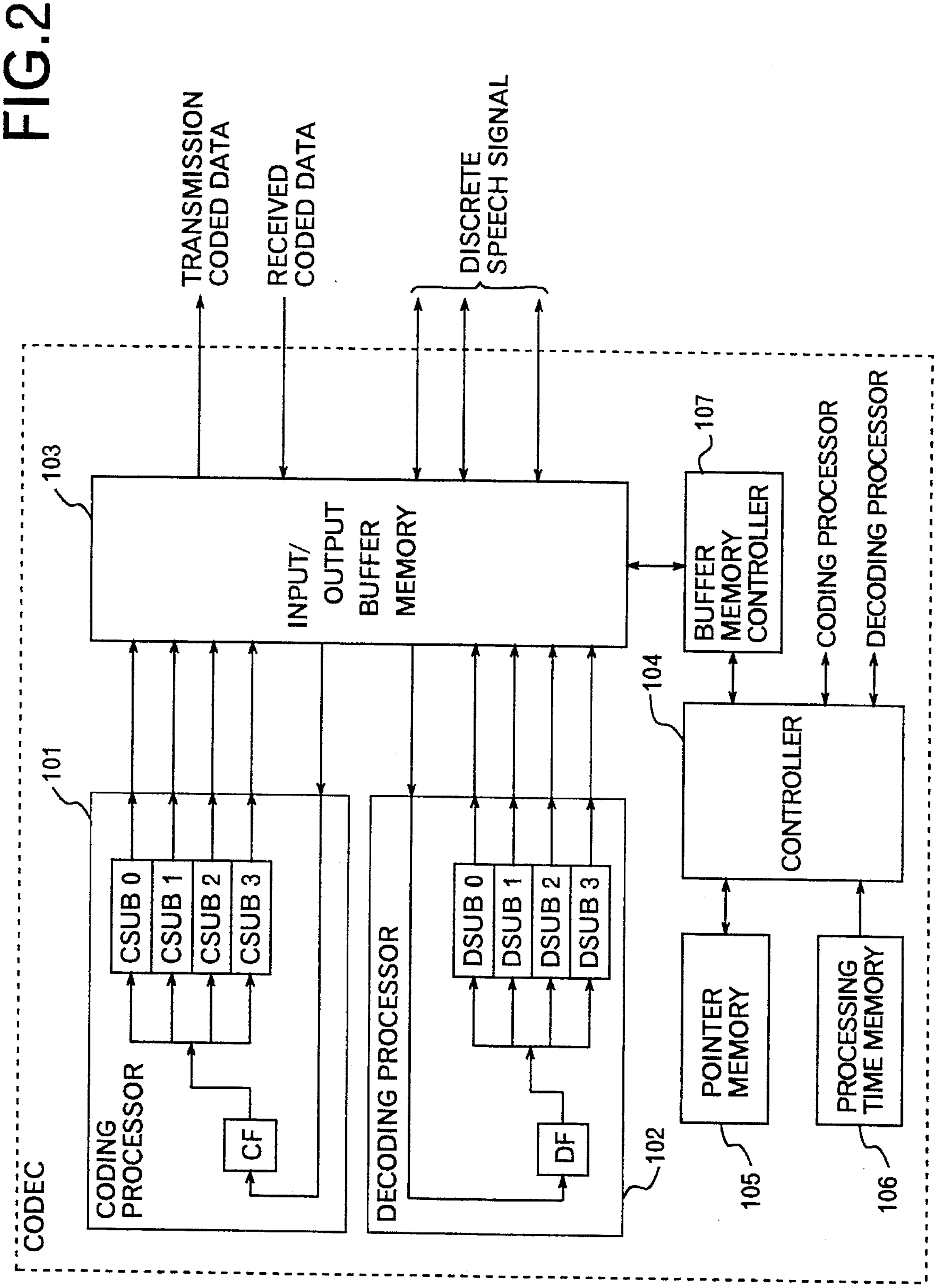
FIG. 2 is a function block diagram showing an audio processing system comprising a one-chip DSP according to an embodiment of the present invention.

Referring to FIG. 2, an speech CODEC device according to the present invention is realized by a one-chip DSP. A coding processor 101 is comprised of a frame processing section CF and four subframe processing sections CSUB0–CSUB3. A decoding processor 102 is also comprised of a frame processing section DF and four subframe processing sections DSUB0–DSUB3.

The coding processor 101 carries out frame processing and subframe processing of a discrete speech signal (e.g. Pulse Code Modulation signal) input from outside. Subframe data coded by each coding subframe process is sent to an input/output buffer memory 103, and one frame of coded data accumulated in buffer memory 103 is output to a modulator (not shown) as transmission coded data.

The decoding processor 102 carries out frame processing and subframe processing of received coded data. Discrete speech data decoded by each decoding subframe process is output as a discrete speech signal to outside via the buffer memory 103.

A controller 104 controls the coding and decoding process in this embodiment. As described later, the controller 104 manages the input/output buffer memory 103 through a buffer memory controller 107 by using a pointer memory 105 and a processing time memory 106 when necessary.

In the present embodiment, the discrete speech signal is a digital signal, for instance, a pulse code modulation signal (PCM) produced by 8 kHz sampling. The 125-μsec period of the digital signal is made a unit of operation time of the CODEC device. As a typical example of coding and decoding scheme, Code Excited LPC Coding (CELP) is known (M. R. Schroeder and B. S. Atal, "Code-Excited Linear Prediction: High quality speech at very low bit rates," IEEE, 1985).

Figures 3, 4, 5:
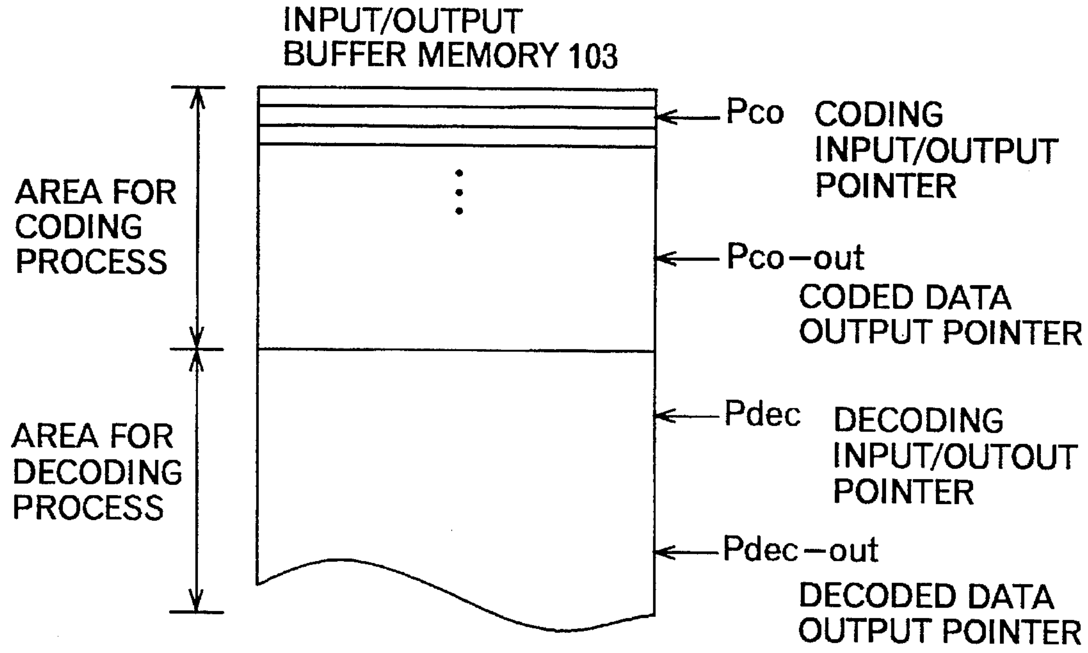
FIG. 3 is a schematic diagram showing an example of a configuration of buffer memory used in the embodiment.
FIG. 4 is a schematic diagram showing an example of a configuration of pointer memory used in the embodiment.
FIG. 5 is a schematic diagram showing an example of a configuration of processing time memory used in the embodiment.

FIG. 3 shows a configuration of the input/output buffer memory 103. The buffer memory 103 is comprised of an area for the coding process and an area for the decoding process. Data input/output is performed according to a coding input/output buffer pointer Pco and a decoding input/output buffer pointer Pdec. More specifically, the coding processor 101 and the decoding processor 102 interrupt the-input/output buffer memory 103 at each unit time, or the sampling period, independent of the main process. At each sampling instance, just as a sample of output data (one unit) is read out from the address indicated by the input/output buffer pointer Pco or Pdec, a sample of input data is written onto the same address. After that, the input/output buffer pointer Pco and Pdec are incremented by one, and then the same input/output operation is repeated.

Since the input/output buffer pointer is incremented by one at each unit time as explained above, it can be used to indicate the current time. Hereinafter, all time points and intervals are expressed using a pointer with the input/output buffer pointer as a reference.

The memory areas for coding process and decoding process are further provided with a coded data output pointer Pco-out and a decoded data output pointer Pdec-out. Upon completion of coding, one frame of coded data is stored at a location indicated by Pco-out as transmission coded data. Upon completion of decoding, a decoded speech data signal is stored at a location indicated by Pdec-out as a discrete speech signal.

FIG. 4 shows a configuration of the pointer memory 105 for storing the above-described pointers used in this embodiment. The controller 104 updates input/output buffer pointers Pco and Pdec at each unit time as described above, and changes the coded data output pointer Pco-out to adjust the coded data transmission timing as described below.

FIG. 5 shows a configuration of the processing time memory 106 for storing pointer values representing the required times to execute the respective subframe processes of coding and decoding. The controller 104 selects an optimum subframe process to be executed during the remaining time in a frame by referencing the processing time memory 106.

An embodiment of a method for executing coding and decoding processes according to the present invention will be described hereinafter.

Figure 6:
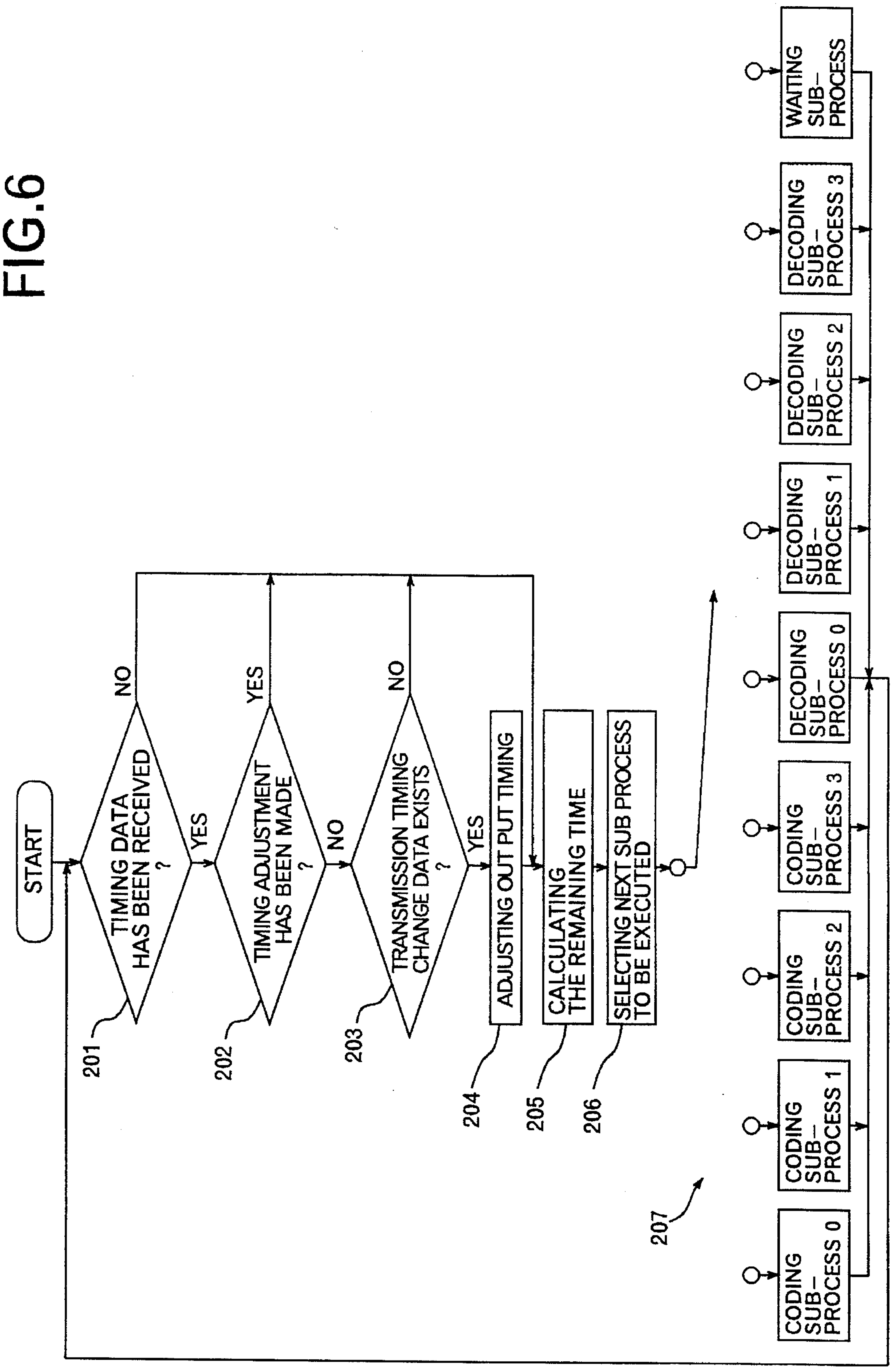
FIG. 6 is a main process flowchart showing an embodiment of speech process execution according to the invention.

FIG. 6 shows the main process of the present embodiment. It should be noted that, as in the conventional case, subprocesses of coding and decoding are executed under the following requirements:

(1) in the coding process, four subframe processes should be completed within the time interval of one frame; and (2) in the decoding process, at least one subframe process should be completed in the time interval of each subframe which is obtained by equally dividing one frame into four subframes. These requirements are represented by deadlines as shown in FIGS. 8A, 8B and FIGS. 9A, 9B.

Referring to FIG. 6, first, it is checked whether the transmission timing data has been received (step 201). If affirmative, it is then checked whether the transmission timing has been adjusted for the relevant frame (step 202 ). If negative, it is checked whether the transmission timing change data is included (step 203). If included, the output timing of coded data is adjusted based on the change data (step 204). That is, the coded data output pointer Pco-out is updated by the amount of change in transmission timing.

After adjusting the output timing, the respective time intervals, or the remaining times, from the current timing to the output timings of the coding and decoding processes in the relevant frames are calculated (step 205), and the subprocess to be executed subsequently is selected (step 206). This selection is made by comparing the calculated remaining time with a time stored in processing time memory 106. The subprocess thus selected is executed (step 207). Steps 201–207 are repeated similarly until all subprocesses of coding and decoding are completed.

Note that the main control goes directly to the remaining time calculation step 205 if the transmission timing data has not been received (No in step 201), if the transmission timing has already been adjusted (Yes in step 202), or if no transmission timing change data exists (No in step 203).

Figure 7:
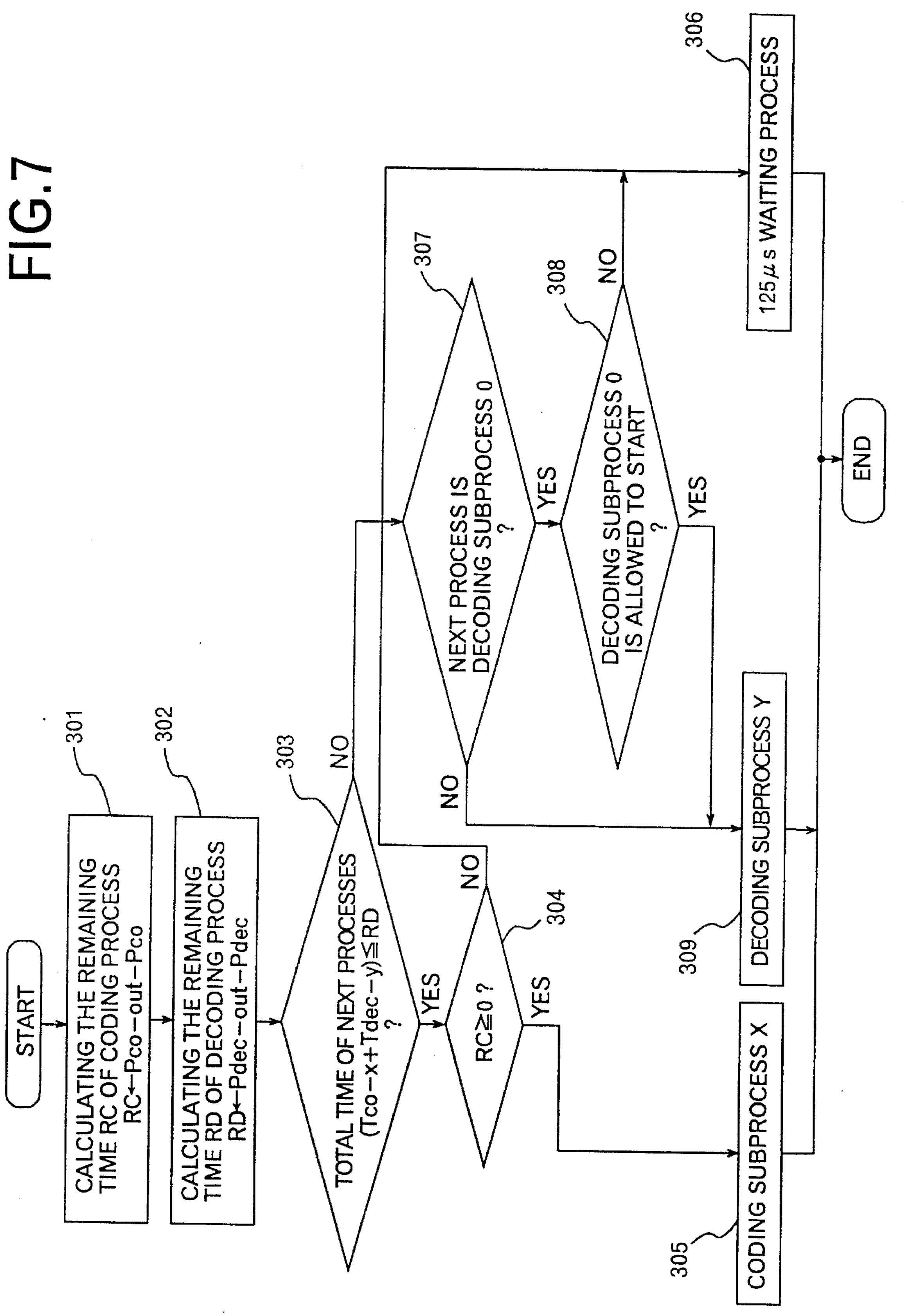
FIG. 7 is a more detailed flowchart showing the remaining time calculation and next process selection steps of FIG. 6.

FIG. 7 is a more detailed flowchart showing the remaining time calculation step 205 and the next subprocess selection step 206 of the above main process flow.

First, a remaining time RC of the coding process is calculated accessing the pointer memory 105 by using the following equation (step 301 ):

$$RC=Pco\text{-}out-Pco,$$

where Pco-out is the coded data output pointer and Pco is the coding input/output pointer.

Similarly, a remaining time RD of the decoding process is calculated using the following equation (step 302):

$$RD=Pdec\text{-}out-Pdec,$$

where Pdec-out is the decoded data output pointer and Pdec is the decoding input/output pointer.

The range in which RC and RD are allowed to vary depends on the sizes of the respective areas in the buffer memory 103. In this embodiment, if the RC or RD value exceeds the time interval of one frame, it is subtracted from the size of the relevant area to be set to a negative value. Therefore, $$-(\text{one frame period})<RC,\ RD\leqq(\text{one frame period}).$$

The following is an example in which RC is negative. When RC is calculated immediately after completion of the final coding subprocess, the time remaining until the next coded data output timing may be longer than one frame. In such a case, RC is set to a negative value.

Then, while referring to the processing time memory 106, the estimated processing time Tco-x of a coding subprocess X (=0, 1, 2, or 3) and the estimated processing time Tdec-y of a decoding subprocess Y (=0, 1, 2, or 3), which are both candidates for the next processing, are summed and it is determined whether the total estimated time is larger than RD (step 303) or not.

If the total estimated time is not larger than RD, coding is selected. First, it is determined whether RC is smaller than 0 (step 304). If RC is not smaller than 0, the coding subprocess X is selected and executed (step 305). If RC is smaller than 0 (No in step 304), in which case the current time has not reached the processing start time, the 125-μs waiting process is executed (step 306).

If the total estimated time is larger than RD (No in step 303), however, decoding is selected. First, if the next process is the decoding subprocess 0 (Yes in step 307), it is determined whether coded data to be decoded has been received (step 308). If the determination is affirmative, in which case decoding can be started, the decoding subprocess 0 is selected and executed (step 309). If no coded data has been received yet, the 125-μs waiting process is executed (step 306). If the next process is not the decoding subprocess 0 (No in step 307), the decoding subprocess Y is selected and executed (step 309).

Figure 8A:
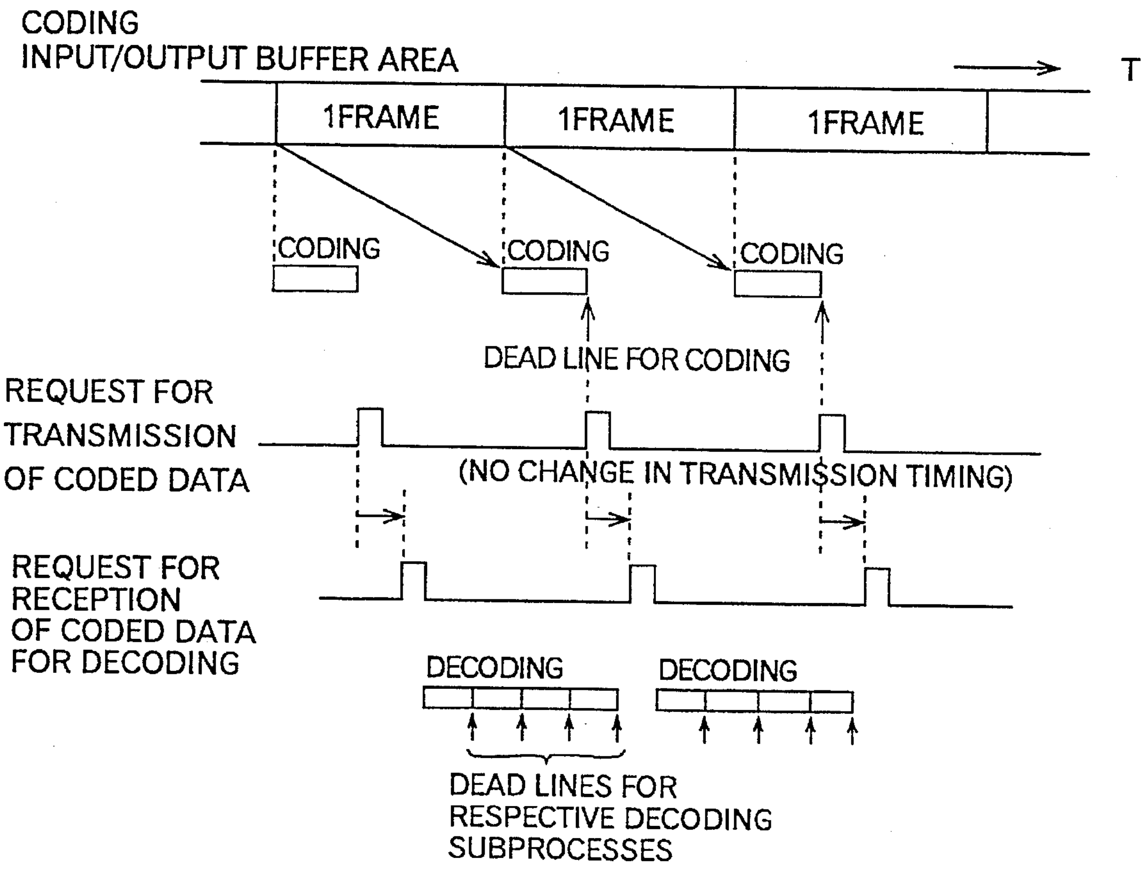
FIG. 8A is a timing chart illustrating coding and decoding processes in the present embodiment when there is no change in coded data transmission timing.
Figure 8B:
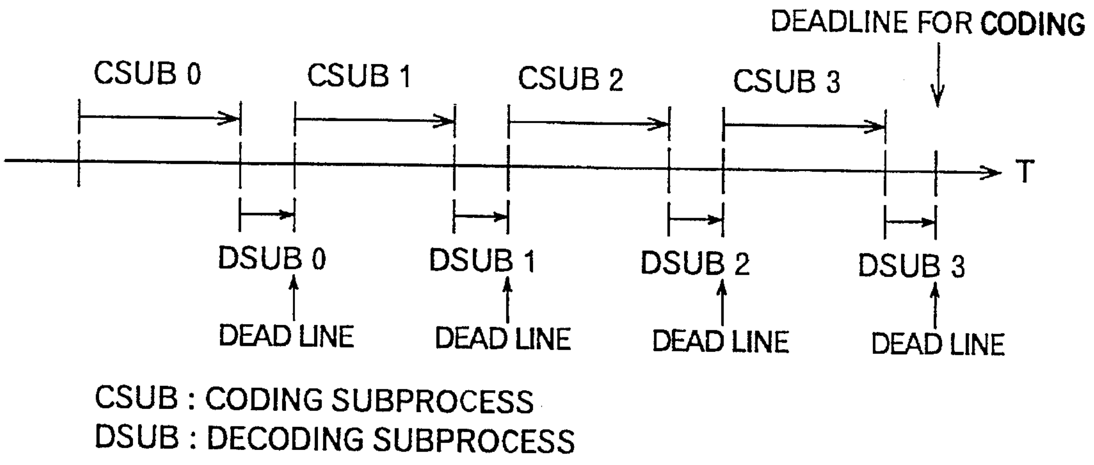
FIG. 8B is a timing chart illustrating a sequence of the coding and decoding subprocesses in FIG. 8A.

FIG. 8A is a timing chart illustrating coding and decoding processes in the present embodiment when there is no change in coded data transmission timing. In coding, four subframe processes are completed by the deadline corresponding to the timing of a request for transmission of coded data. In decoding, at least one subframe process is completed by each deadline which is obtained by equally dividing one frame into four. In this case, a sequence of the coding and decoding subprocesses is determined, for example, as shown in FIG. 8B. A coding subprocess CSUB1–CSUB3 and a decoding subprocess DSUB0–DSUB3 are alternately executed before the respective deadlines.

FIG. 8B is a timing chart illustrating a sequence of the coding and decoding subprocesses of FIG. 8A.

Figure 9A:
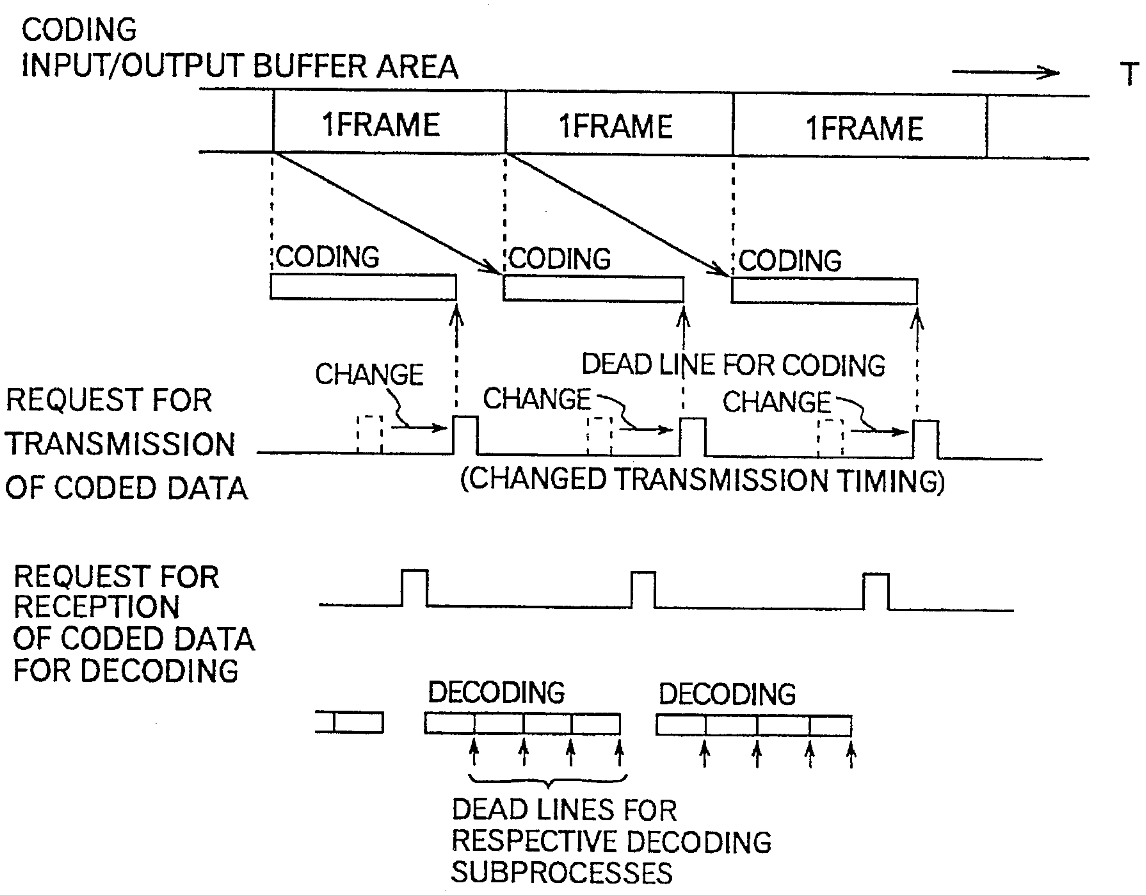
FIG. 9A is a timing chart illustrating coding and decoding processes in the present embodiment when the transmission timing change data exists.

FIG. 9A is a timing chart illustrating coding and decoding processes in the present embodiment when the transmission timing change data exists. After adjusting the transmission timing of coded data (step 204 in FIG. 6), the remaining time is calculated and a subprocess to be executed subsequently is selected, as shown in FIG. 7. In this way, a resultant sequence of coding and decoding subprocesses is determined, for example, as shown in FIG. 9B.

Figure 9B:
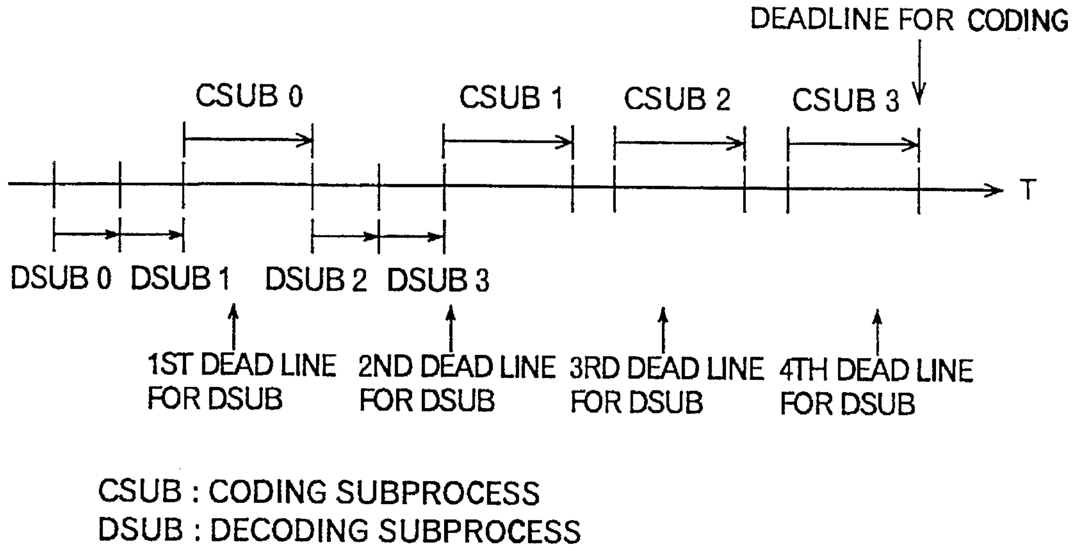
FIG. 9B is a timing chart illustrating a sequence of the coding and decoding subprocesses in FIG. 9A.

In FIG. 9B, after the decoding subprocess DSUB0 has been completed, a candidate to be subsequently executed is either the decoding subprocess DSUB1 or the coding subprocess CSUB0. If the total required time (Tco-0+Tdec-1) of CSUB0 and DSUB1 is larger than the time RD remaining until the first deadline for decoding subprocess, DSUB1 is selected and executed. Therefore, DSUB0 and DSUB1 have been executed before the first deadline. At this point, the next candidate is CSUB0 or DSUB2. If the total required time (Tco-0 +Tdec-2) is smaller than the remaining time RD, CSUB0 is selected and executed. Similar operation is repeated to execute all the subprocesses DSUB0–DSUB3 and CSUB0–CSUB3 in the sequence as shown in FIG. 9B.

As described above, in the speech information processing system according to the present invention, under such conditions that the coded data receiving timing is fixed and the coded data transmission timing is varied, the remaining time in coding is calculated frame by frame and a subprocess suitable for the calculated remaining time is selected and executed. As a result, the delay time of coding and decoding is considerably reduced, shortening the delay in speech information processing.

I claim:

1. A method for executing a coding and decoding process in frames, each frame comprising a plurality of subframes in a digital communication device, said coding and decoding process comprising a plurality of coding subprocesses and a plurality of decoding subprocesses, each of said coding subprocesses coding input digital data into transmission data for each of said subframes on condition that said coded subprocesses are completed by a first time point for each frame, each of said decoding subprocess decoding reception data into output digital data for each of said subframes on condition that at least one decoding subprocess is completed by a second time point for each said frame, said first time point varying according to transmission timing data received from outside, and the reception timing of said reception data being fixed, the method comprising the steps, in said digital communication device, of:

a) storing, in a first memory in said digital communication device, predetermined processing time values each representing time required to perform one of said coding subprocesses and said decoding subprocesses;

b) executing a first subprocess selected from said coding subprocesses and said decoding subprocesses;

c) checking whether said transmission timing data indicates a change of transmission timing of said transmission data after executing said first subprocess;

d) adjusting said first time point according to said transmission timing data when said transmission timing data indicates said change of said transmission timing;

e) detecting a first time interval from a current time point to said first time point after adjusting said transmission timing, and storing said first time interval;

f) detecting a second time interval from said current time point to said second time point, and storing said second time interval;

g) calculating a total processing time value of a coding subprocess and a decoding subprocess represented by said predetermined processing time values, and storing said total processing time value, said coding subprocess and said decoding subprocess being both allowed to be subsequently executed according to respective predetermined sequences of said coding subprocesses and said decoding subprocesses;

h) comparing said stored total processing time value with a smaller one of said stored first time interval and said stored second time interval;

i) selecting a second subprocess to be subsequently executed from said coding subprocess and said decoding subprocess which are both allowed to be subsequently executed, said coding subprocess being selected when said stored total processing time value is not larger than said smaller one of said stored first time interval and said stored second time interval, and said decoding subprocess being selected when said stored total processing time value is larger than said smaller one of said stored first time interval and said stored second time interval; and j) executing said second subprocess following said first subprocess.

2. The method according to claim 1, wherein, in said step (a), said predetermined processing time values comprise first processing time values and second processing time values of said coding subprocesses and said decoding subprocesses, respectively, and said first processing time values and said second processing time values are stored in the first memory in predetermined order, respectively.

3. The method according to claim 1, wherein said first time point, said second time point and said current time point are stored as address pointers in an input/output memory in said digital communication device.

4. The method according to claim 3, wherein, in said step (e):

said first time interval is detected by calculating a difference in address between said current time point and said first time point after adjusting said transmission timing; and in said step (f):

said second time interval is detected by calculating a difference in address between said current time point and said second time point.

5. The method according to claim 1, wherein said input digital data and said output digital data are discrete speech signals.

6. A digital communication device for executing a coding and decoding process in frames, each frame comprising a plurality of subframes, said coding and decoding process comprising a plurality of coding subprocesses and a plurality of decoding subprocesses, said device comprising:

a coding processor for performing said coding subprocesses, each of said coding subprocesses coding input digital data into transmission data for each of said subframes on condition that said coding subprocesses are completed by a first time point for each of said frames, said first time point varying according to transmission timing data received from outside;

a decoding processor for performing said decoding subprocesses, each of said decoding subprocesses decoding reception data into output digital data for each of said subframes on condition that at least one decoding subprocess is completed by a second time point for each of said frames, the reception timing of said reception data being fixed;

storing means for storing predetermined processing time values, each of said predetermined processing time values representing time required to perform one of said coding subprocesses and said decoding subprocesses; and control means for controlling said coding processor, said decoding processor and said storing means to execute a first subprocess selected from said coding subprocesses and said decoding subprocesses, for checking whether said transmission timing data is received, and for checking whether said transmission timing data indicates a change of transmission timing of said transmission data after performing said first subprocess; for adjusting said first time point according to said transmission timing data when said transmission timing data indicates said change of said transmission timing; for detecting a first time interval from a current time point to said first time point after adjusting said transmission timing; for detecting a second time interval from said current time point to said second time point, and for calculating a total processing time value of a coding subprocess and a decoding subprocess referring to said predetermined processing time values; said coding subprocess and said decoding subprocess being both allowed to be subsequently executed according to respective predetermined sequences of said coding subprocesses and said decoding subprocesses; for comparing said total processing time value with a smaller one of said first time interval and said second time interval; for selecting a second subprocess to be subsequently executed from said coding subprocess and said decoding subprocess which are both allowed to be subsequently executed, said coding subprocess being selected when said total processing time value is not larger than said smaller one of said first time interval and said second time interval, and said decoding subprocess being selected when said total processing time value is larger than said smaller one of said first time interval and said second time interval; and for executing said second subprocess following said first subprocess.

7. The digital communication device according to claim 6, wherein said predetermined processing time values comprise first processing time values and second processing time values of said coding subprocesses and said decoding subprocesses, respectively, and said first processing time values and said second processing time values being stored in said storing means in predetermined order, respectively.

8. The digital communication device according to claim 6, further comprising an input/output memory provided with address pointers representing said first time point, said second time point and said current time point.

9. The digital communication device according to claim 8, wherein:

said first time interval is detected by calculating a difference in address between said current time point and said first time point after adjusting said transmission timing; and said second time interval is detected by calculating a difference in address between said current time point and said second time point.

10. The digital communication device according to claim 6, wherein said input digital data and said output digital data are discrete speech signals.

* * * * *